C. B. JONES.
GRAPPLE.
APPLICATION FILED MAR. 23, 1911.
1,031,270.
Patented July 2, 1912.
2 SHEETS—SHEET 1.
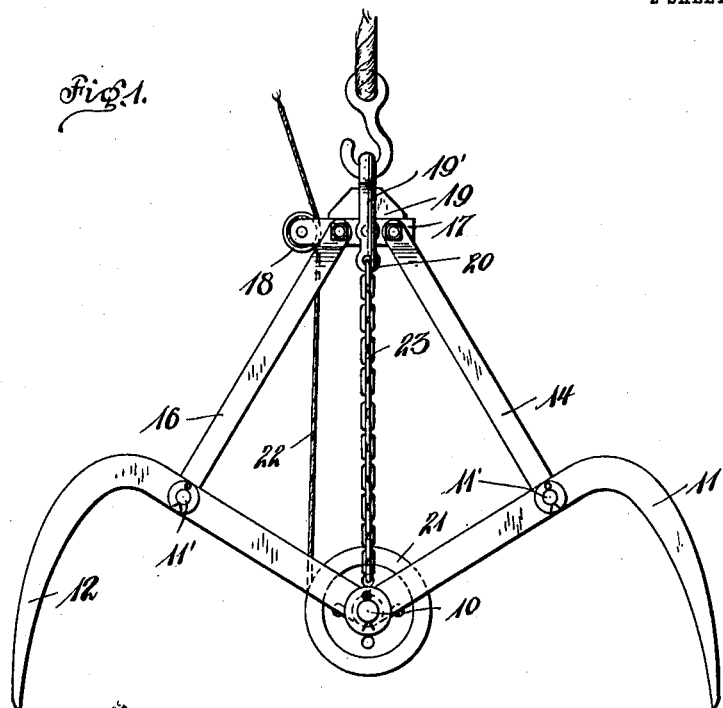
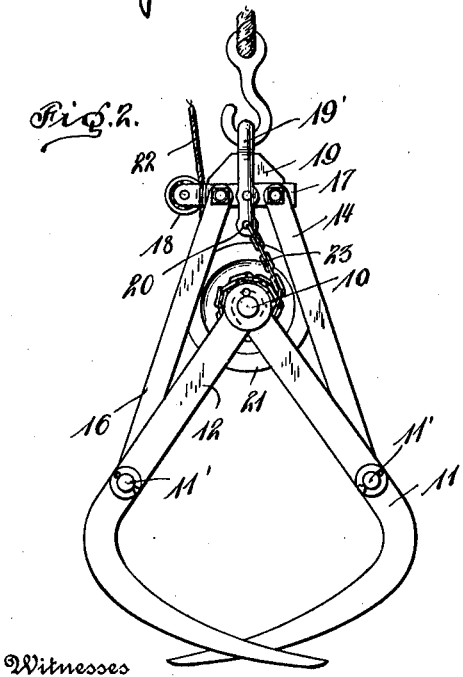
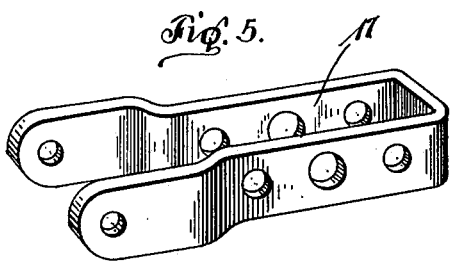
Witnesses
Ernest Crocker
J. E. Burch.
Inventor
Cable B. Jones
By Crandall Crandall
Attorney C. B. JONES.
GRAPPLE.
APPLICATION FILED MAR. 23, 1911.
1,031,270.
Patented July 2, 1912.
2 SHEETS—SHEET 2.
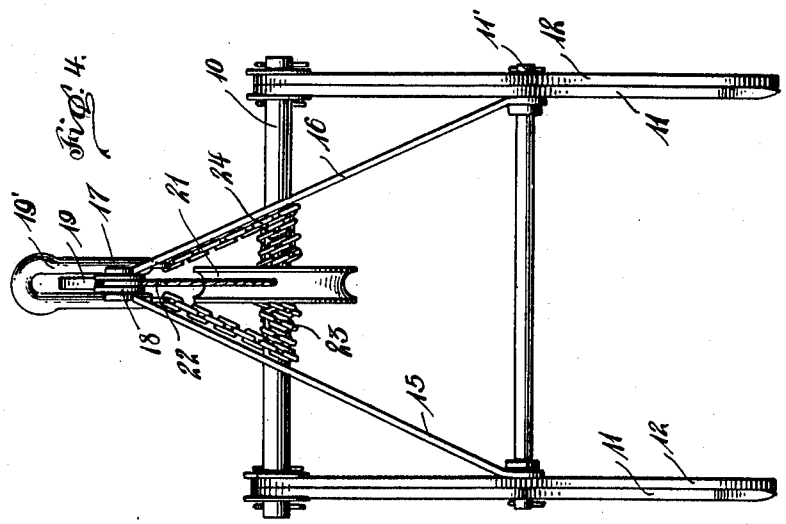
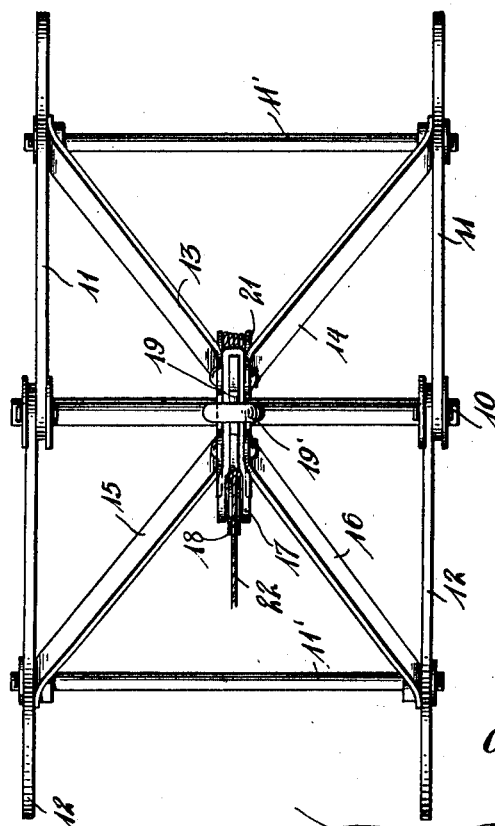

UNITED STATES PATENT OFFICE.

CABLE B. JONES, OF WHITEWOOD, SOUTH DAKOTA.

GRAPPLE.

1,031,270.  Specification of Letters Patent.  Patented July 2, 1912.

Application filed March 23, 1911.  Serial No. 616,382.

*To all whom it may concern:*

Be it known that I, CABLE B. JONES, a citizen of the United States, residing at Whitewood, in the county of Lawrence, State of South Dakota, have invented certain new and useful Improvements in Grapples; and I do hereby declare the following to be a full, clear, and exact description of the invention, such as will enable others skilled in the art to which it appertains to make and use the same.

This invention relates to an improvement in grapples.

The primary object of the invention is to provide a grapple which may be conveniently held in its open position in order to grasp the hay or other material to be lifted and which may be readily closed, the closing and opening of the gripping jaws being accomplished from a point distant from the grapple.

With the above and other objects in view the invention consists in certain constructions, combinations and arrangements of parts, clearly described in the following specification and clearly illustrated in the accompanying drawings.

In the drawings:—Figure 1 is a side elevation of the device in its open position. Fig. 2 is a similar view in its closed position. Fig. 3 is a top plan view. Fig. 4 is an end view. Fig. 5 is a detail perspective view of a U-shaped bracket used in connection with the device.

In the drawings, 10 designates the fork supporting shaft on which is pivotally swung fork members 11 and 12, each fork consisting of two hooks which are connected by a rod 11′ on which a plurality of tines may be secured, said tines being omitted in the drawing in order to show the operating mechanism more clearly. A plurality of struts 13, 14, 15 and 16 have their end portions secured to the rods 11′ said end portions being slightly offset, the other end of said struts extending to a point immediately above the central portion of the shaft 10 where they are secured in pairs to a U-shaped bracket 17 the free ends of which support a pulley 18. A plate 19 is embraced by said bracket, said plate being secured to said brackets by the bolts which pass through the end portions of the struts. A hanger 19′ is pivotally supported by said bracket and plate, the free ends 20 of said hanger extending below the plate said free ends being provided with a chain 23 which is wound around the shaft 10. A pulley 21 is mounted centrally on said shaft, said chain winding on said shaft at either side of said pulley, the chain passing through an aperture in the web of the same. A cable 22 is secured to said pulley and arranged to wind on the same, said cable being passed over the pulley 18 which is supported by the bracket 17 and thence to any convenient point from which it is desired to operate the fork.

In Fig. 1 the fork is shown in its open position to receive the load. While in this position it will be noted that the cable 22 is wound upon the drum, the chain 23 being extended to its full length, this being the normal position of the grapple and after the same has become embedded in the material to be lifted the cable 22 is drawn which rotates the pulley and shaft, shortening the chain 23 and drawing the shaft to a point adjacent the hanger thus closing the forks on said material. When it is desired to dump said material the cable 22 is released allowing the forks to assume the position shown in Fig. 1, the opening and closing of the forks thus being accomplished by means of the cable 22 which through its connection with the shaft 10 either extends or contracts the chains 23 spacing the said shaft 10 from the hanger 19′.

I claim:—

A grapple comprising a shaft, a pair of forks each comprising a pair of spaced tines pivotally connected to the ends of the shaft and held against displacement in either direction, rods connecting the respective pairs of tines, said rods extending through said tines and provided to hold the latter against displacement in either direction, a U-shaped bracket member having a pair of registering apertures and similar pairs of apertures adjacent thereto and upon opposite sides thereof, a spacing plate within the bracket and having apertures alining with the aforesaid apertures, struts connected to each rod adjacent each tine and having angular end portions pivotally and detachably connected through said apertures spaced upon opposite sides of the first mentioned apertures, a hanger pivotally connected intermediate of its ends through said first mentioned apertures and having its bight portion movable over the plate for retaining a supporting hook therein and means for spacing said bracket and shaft to open and close said forks.

In testimony whereof, I affix my signature, in presence of two witnesses.

CABLE B. JONES.

Witnesses:
H. T. COOPER,
IDA UHLIG.

Copies of this patent may be obtained for five cents each, by addressing the "Commissioner of Patents, Washington, D. C."